(12) United States Patent
Mohammed et al.

(10) Patent No.: US 10,743,563 B2
(45) Date of Patent: Aug. 18, 2020

(54) FROZEN BEVERAGE DISPENSER

(71) Applicant: PW Stoelting, L.L.C., Sheboygan, WI (US)

(72) Inventors: Aamer Mohammed, Manitowoc, WI (US); Ken Wetenkamp, Plymouth, WI (US); Richard Koehl, Sheboygan Falls, WI (US)

(73) Assignee: THE VOLLRATH COMPANY, L.L.C., Sheboygan, WI (US)

( * ) Notice: Subject to any disclaimer, the term of this patent is extended or adjusted under 35 U.S.C. 154(b) by 227 days.

(21) Appl. No.: 14/873,649

(22) Filed: Oct. 2, 2015

(65) Prior Publication Data

US 2017/0094990 A1    Apr. 6, 2017

(51) Int. Cl.
| | |
|---|---|
| *A23G 9/28* | (2006.01) |
| *F21V 23/06* | (2006.01) |
| *F16K 31/60* | (2006.01) |
| *F16K 1/12* | (2006.01) |
| *A23G 9/04* | (2006.01) |

(Continued)

(52) U.S. Cl.
CPC ............. *A23G 9/281* (2013.01); *A23G 9/045* (2013.01); *A23G 9/224* (2013.01); *F16K 1/12* (2013.01); *F16K 31/52408* (2013.01); *F16K 31/602* (2013.01)

(58) Field of Classification Search
CPC ........ A23G 9/281; A23G 9/045; A23G 9/224; F16K 1/12; F16K 31/602; F16K 31/52408; F21V 23/06; F25D 2323/00262; F25D 2323/0027; F25D 2323/00272; F25D 2323/00275; F25D 2323/00278

USPC ........ 62/342, 389, 452–456; 222/113, 185.1, 222/146.1, 146.6
See application file for complete search history.

(56) References Cited

U.S. PATENT DOCUMENTS

| | | | | |
|---|---|---|---|---|
| 4,514,994 A | * | 5/1985 | Mabb .................. | B01F 3/04808 222/399 |
| 4,964,542 A | * | 10/1990 | Smith ...................... | A23G 9/04 222/146.6 |

(Continued)

OTHER PUBLICATIONS

Stoelting, A Vollrath Company, Frozen Uncarbonated Beverage Dispensers, Stoelting Foodservice Equipment, Feb. 17, 2015, 2 pages.

(Continued)

*Primary Examiner* — Paul R Durand
*Assistant Examiner* — Andrew P Bainbridge
(74) *Attorney, Agent, or Firm* — Foley & Lardner LLP

(57) ABSTRACT

A frozen beverage dispenser includes a housing, a hopper configured to store a beverage product, a freezing chamber, a front cover removably coupled to the housing, a refrigeration system, an auger positioned within the freezing chamber, a drive configured to rotate the auger, an air inlet formed near the bottom of the housing, a single air outlet formed near the rear and the top of the housing, a fan for drawing air through the air inlet into the interior of the housing and exhausting air from the interior of the housing through the single air outlet, a spigot fluidly coupled to the freezing chamber, the spigot including a valve and an outlet wherein with the valve in a closed position, frozen beverage does not pass through the valve and with the valve in an open position, frozen beverage passes through the valve and exits through the outlet of the spigot.

20 Claims, 5 Drawing Sheets

(51) Int. Cl.
*A23G 9/22* (2006.01)
*F16K 31/524* (2006.01)

(56) References Cited

U.S. PATENT DOCUMENTS

| | | | | |
|---|---|---|---|---|
| 5,086,951 | A * | 2/1992 | Nakayama | B67D 1/0021 222/129.1 |
| 5,190,188 | A * | 3/1993 | Credle, Jr. | B67D 1/0021 222/1 |
| 5,570,984 | A * | 11/1996 | Reznikov | F16B 21/02 411/551 |
| 5,927,557 | A * | 7/1999 | Busick | B67D 3/04 222/185.1 |
| 5,992,685 | A * | 11/1999 | Credle, Jr. | B67D 1/0021 222/1 |
| 6,349,852 | B1 * | 2/2002 | Ford | B67D 1/0042 222/129.1 |
| 6,370,884 | B1 * | 4/2002 | Kelada | B67D 1/0869 62/3.3 |
| 6,488,058 | B1 * | 12/2002 | Dyer | B67D 1/0832 141/346 |
| 6,494,055 | B1 * | 12/2002 | Meserole | A23G 9/045 366/305 |
| 6,705,106 | B1 * | 3/2004 | Cunha | A23G 9/045 222/146.6 |
| 6,745,592 | B1 * | 6/2004 | Edrington | A23G 9/045 426/524 |
| 6,761,284 | B2 * | 7/2004 | Knepler | B67D 1/0871 222/129.4 |
| 6,783,028 | B1 * | 8/2004 | Ambrose | B67D 7/426 141/392 |
| 6,979,096 | B2 * | 12/2005 | Ortega | B67D 1/0875 362/101 |
| 7,631,511 | B2 * | 12/2009 | Al-Azmi | F24F 1/025 62/199 |
| 8,590,337 | B2 * | 11/2013 | Lafaire | F25D 23/003 165/149 |
| 8,708,197 | B1 * | 4/2014 | Brewer | B67D 1/0862 222/113 |
| 2001/0004081 | A1 * | 6/2001 | Tansley | B67D 1/0009 222/61 |
| 2003/0080644 | A1 * | 5/2003 | Nelson | A23G 9/045 310/196 |
| 2005/0115272 | A1 * | 6/2005 | Lim | F25D 23/10 62/507 |
| 2005/0120738 | A1 * | 6/2005 | Chun | F25D 23/003 62/455 |
| 2005/0178139 | A1 * | 8/2005 | Kim | F25D 21/04 62/277 |
| 2005/0229622 | A1 * | 10/2005 | Franck | A23G 9/045 62/352 |
| 2007/0017234 | A1 * | 1/2007 | Moulder | A23G 9/045 62/66 |
| 2009/0165495 | A1 * | 7/2009 | Popov | F25D 21/04 62/441 |
| 2010/0187258 | A1 * | 7/2010 | Santy | B67D 1/0044 222/129.1 |
| 2010/0218510 | A1 * | 9/2010 | Kim | A23G 9/045 62/3.1 |
| 2010/0281909 | A1 * | 11/2010 | Carpanzano | B67D 3/0009 62/386 |
| 2013/0255305 | A1 * | 10/2013 | Kim | F25D 23/003 62/426 |
| 2014/0209635 | A1 * | 7/2014 | Gates | A23G 9/045 222/144.5 |
| 2014/0273795 | A1 * | 9/2014 | Koppenhaver | F25D 11/02 454/251 |
| 2014/0299628 | A1 * | 10/2014 | Gormley | B67D 1/0872 222/113 |
| 2014/0374519 | A1 * | 12/2014 | Davis | A23G 9/12 241/101.8 |
| 2015/0260308 | A1 * | 9/2015 | Fry | F16K 31/602 137/1 |

OTHER PUBLICATIONS

Stoelting, A Vollrath Company, L.L.C., Enhance the Appeal of Your Frozen Beverage Menu, Frozen Uncarbonated Beverage Dispensers, available at least as early as Jan. 1, 2015, 1 page.

\* cited by examiner

FROZEN BEVERAGE DISPENSER

BACKGROUND

The present invention relates generally to the field of beverage dispensers, particularly, a frozen beverage dispenser.

Frozen beverage dispensers may be configured to dispense a wide variety of alcoholic and non-alcoholic frozen beverages (e.g., slushes), such as cocktails (e.g., margaritas, daiquiris, etc.), frozen coffee, frozen lemonade, frozen fruit juices, slushies, and smoothies. The frozen beverage may be dispensed as a single serving into a glass, or may be dispensed in large amounts in a larger container, such as a pitcher. It is desirable for the frozen beverage dispenser to be operable with one hand by the operator, freeing the other hand to hold the container, large or small, in which the frozen beverage is being dispensed.

As with other equipment used in the preparation of beverages, especially in a commercial environment, a frozen beverage dispenser must be regularly cleaned and sanitized to inhibit the growth of microbes. To clean the frozen beverage dispenser, it must typically be disassembled.

Frozen beverage dispensers typically include noise-producing mechanisms, including fans, motors, compressors, and other rotating or otherwise moving equipment. These noise-producing mechanisms can result in relatively loud noise levels experienced by operators or customers when the frozen beverage dispenser is in operation, especially when multiple frozen beverage dispensers are placed in operation at the same time as may be the case at a restaurant or bar.

SUMMARY OF THE INVENTION

One embodiment of the invention relates to a frozen beverage dispenser including a housing defining an interior, a hopper configured to store a beverage product, a freezing chamber fluidly coupled to the hopper, a front cover removably coupled to the housing to close a front end of the freezing chamber, a refrigeration system configured to refrigerate the beverage product in the freezer chamber to form the frozen beverage product, an auger positioned within the freezing chamber, a drive configured to rotate the auger about an auger rotation axis thereby causing the auger to circulate the beverage product within the freezing chamber, an air inlet formed near the bottom of the housing, a single air outlet formed near the rear and the top of the housing, a fan for drawing air through the air inlet into the interior of the housing and exhausting air from the interior of the housing through the single air outlet, a spigot fluidly coupled to the freezing chamber, the spigot including a handle, a valve, and an outlet, with the handle coupled to the valve to control operation of the valve, wherein with the valve in a closed position, the frozen beverage product does not pass through the valve and with the valve in an open position, the frozen beverage product passes through the valve and exits through the outlet of the spigot.

Another embodiment of the invention relates to a frozen beverage dispenser including a hopper configured to store a beverage product, a freezing chamber fluidly coupled to the hopper, a refrigeration system configured to refrigerate the beverage product in the freezer chamber to form the frozen beverage product, an auger positioned within the freezing chamber, a drive configured to rotate the auger about an auger rotation axis thereby causing the auger to circulate the beverage product within the freezing chamber, and a spigot fluidly coupled to the freezing chamber, the spigot including a handle, a valve, and an outlet, with the handle coupled to the valve to control operation of the valve, wherein with the valve in a closed position, the frozen beverage product does not pass through the valve and with the valve in an open position, the frozen beverage product passes through the valve and exits through the outlet of the spigot, wherein the handle is movable among three positions so that with the handle in the first position the valve is in the closed position, with the handle in the second position the valve is in the open position, and with the handle in the third position the valve is in the open position, wherein the first position of the handle is located between the second and third positions of the handle, and wherein the handle is configured so that an operator pulls the handle toward the operator to move the handle to the second position to dispense the frozen beverage product from the outlet of the spigot and pushes the handle away from the operator to move the handle to the third position to dispense the frozen beverage product from the outlet of the spigot.

Another embodiment of the invention relates to a frozen beverage dispenser including a housing including multiple contacts electrically coupled to an electrical system, a hopper configured to store a beverage product, a freezing chamber fluidly coupled to the hopper, a front cover removably coupled to the housing to close a front end of the freezing chamber, wherein the front cover includes an illumination device positioned to illuminate the front cover and the beverage product within the freezing chamber, wherein the front cover includes multiple pins extending from the cover and the pins are electrically coupled to the illumination device, wherein when the front cover is coupled to the housing each of the contacts receives one of the pins to electrically couple the illumination device to the electrical system for powering the illumination device, a refrigeration system configured to refrigerate the beverage product in the freezer chamber to form a frozen beverage product, an auger positioned within the freezing chamber, a drive configured to rotate the auger about an auger rotation axis thereby causing the auger to circulate the beverage product within the freezing chamber, and a spigot fluidly coupled to the freezing chamber, the spigot including a handle, a valve, and an outlet, with the handle coupled to the valve to control operation of the valve, wherein with the valve in a closed position, frozen beverage does not pass through the valve and with the valve in an open position, frozen beverage passes through the valve and exits through the outlet of the spigot.

It is to be understood that both the foregoing general description and the following detailed description are exemplary and explanatory only, and are not restrictive of the invention as claimed.

BRIEF DESCRIPTION OF THE DRAWINGS

Features, aspects, and advantages of the present invention will become apparent from the following description, appended claims, and the accompanying exemplary embodiments shown in the drawings, which are briefly described below.

DETAILED DESCRIPTION

Figure 1:
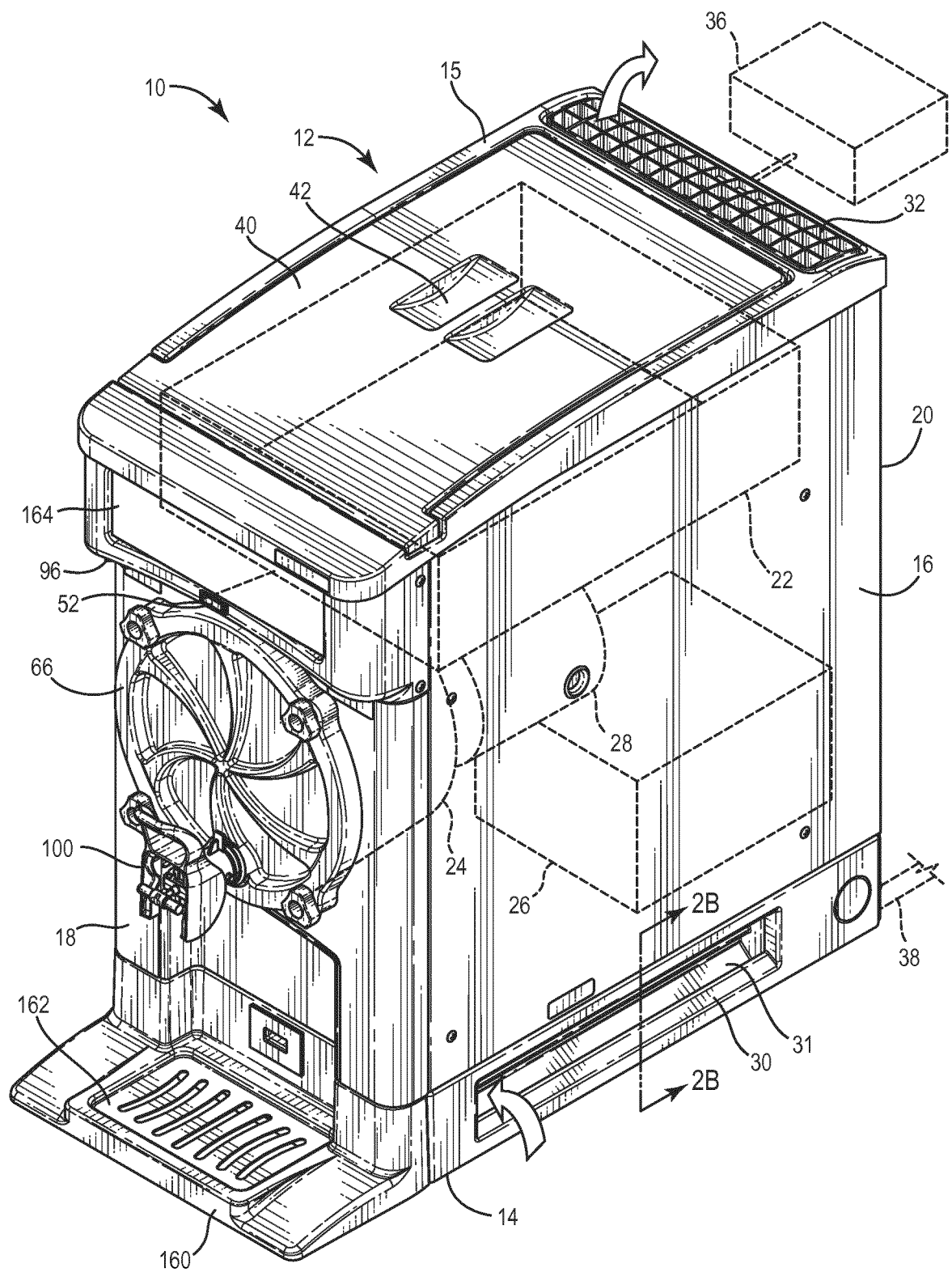
FIG. 1 is a perspective view of a frozen beverage dispenser, according to an exemplary embodiment.
Figure 2A:
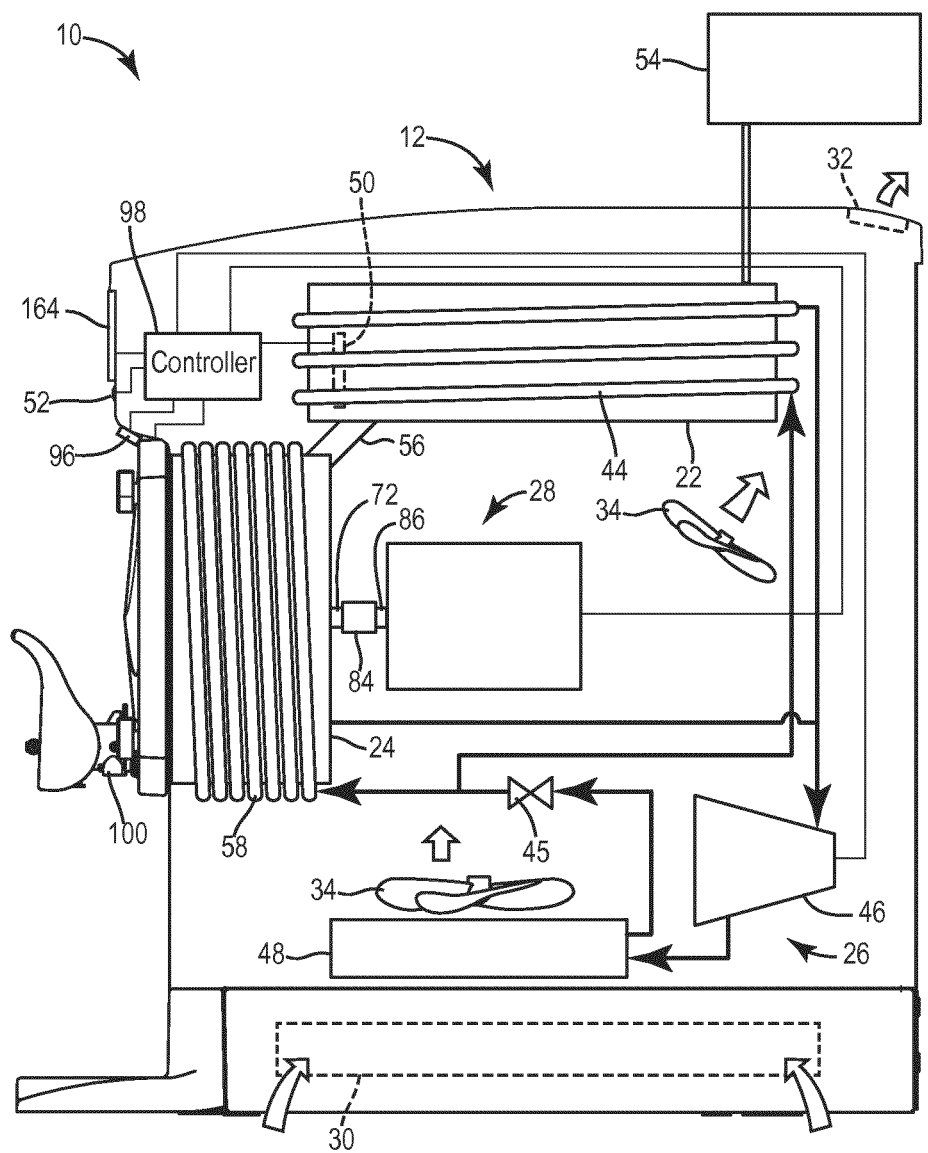
FIG. 2A is a schematic diagram of the internal components of the frozen beverage dispenser of FIG. 1.

Referring to FIGS. 1 and 2, a frozen beverage dispenser 10 is shown according to an exemplary embodiment. The frozen beverage dispenser 10 includes a housing or cabinet 12 having a bottom 14, top 15, side walls 16, a front panel 18, and a rear panel 20. The housing 12 contains a storage compartment or hopper 22 in which a beverage product is stored in an unfrozen state, a freezing chamber 24 in which the beverage product is chilled to form a slush, a refrigeration system 26 configured to chill the beverage product contained in the hopper 22 and in the freezing chamber 24, and a drive mechanism 28 configured to rotate an auger to circulate the frozen beverage product within the freezing chamber 24.

In some embodiments, the internal components of the frozen beverage dispenser 10 may be air cooled and the housing 12 may include vents or other openings to allow air to flow through the interior of the housing 12. The housing 12 includes one or more air openings or inlets 30 formed in the housing 12 to allow air to enter the interior of the housing 12. As shown in FIG. 1, the air inlet 30 is located near the bottom 14 of the housing 12 and formed in the side wall 16. In some embodiments, a matching air inlet 30 is found on the opposite side of the housing 12. The housing 12 also includes a single air outlet 32 for exhausting air from the interior of the housing 12. The air outlet 32 is located on the top 15 of the housing 12 near the rear panel 20. Cooling air is drawn in the housing 12 through the air inlet or inlets 30, with a fan 34, blower, or other air circulation device. The cooling air passes through the interior to cool the components located within the housing (e.g., the drive mechanism 28) and exits the housing 12 through the air outlet 32. The frozen beverage dispenser 10 is positioned to allow for unrestricted air flow through the air inlets 30 and the air outlet 32 (e.g., relative to another frozen beverage dispenser disposed along the side wall 16, another appliance, a wall, etc.).

Figure 2B:
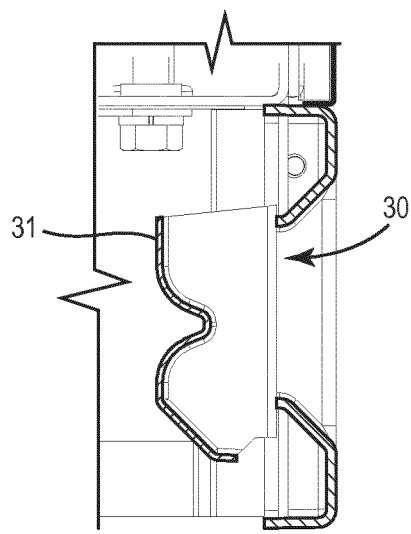
FIG. 2B is a cross-section view of an air inlet of the frozen beverage dispenser of FIG. 1, taken along line 2B-2B.

The air inlets 30 may include devices, shown as baffles 31, that are configured to inhibit the propagation of sound waves from the interior of the housing 12 to the exterior. As shown in FIG. 2B, the baffles 31 are positioned so that sound waves from the interior of the housing 12 do not have a direct straight line path from the interior of the housing 12 to the exterior and are instead required to take a circuitous path to exit the housing 12. The placement of the only air outlet 32 at the top and rear of the housing 12 of the frozen beverage dispenser 10 reduces the noise (e.g., noise caused by internal components of the frozen beverage dispenser 10, such as fans, motors, etc.) experienced at the front of the frozen beverage dispenser 10 by the operator of the dispenser or by customers are observing the dispenser. Conventional frozen beverage dispensers typically include multiple air inlet and outlet openings at various elevations in various panels of the housing (e.g., openings near both the top and bottom of the side housing panels, openings near both the top and bottom of the rear housing panel, etc.). Such known dispensers allow sounds generated within the housing a direct straight line path out of the housing. By limiting the air inlets 30 to a location near the bottom of the housing 12 (with air inlet 30 toward the front of the housing 12) and the single air outlet 32 to a location near the top and rear of the housing 12, a cooling air flow is provided for the interior of the housing that allows sufficient air flow from both front-to-rear and bottom-to-top within the housing while reducing possible locations for sounds from the interior to exit the housing 12. The top, rear location of the air outlet 32 is positioned away from operators and customers who are either accessing or observing the front of the frozen beverage dispenser 10. The air outlet 32 is the only intended exit for the cooling air flow from the housing 12, limiting the amount of possible locations for sounds to exit the housing 12 due to the air cooling system.

In some embodiments, one or more internal components of the frozen beverage dispenser 10 may be water cooled. Cooling water may be provided from an external water source 36 and collect waste heat as it flows through internal plumbing before being expelled through a drain 38. Water cooling may be used in addition to or in combination with air cooling.

Multiple frozen beverage dispensers 10 may be provided side by side (while providing sufficient clearance for vent openings in the housing for air cooling), with each frozen beverage dispenser 10 capable of dispensing a separate type or flavor of frozen beverage. The housing 12 has a relatively small depth and width, giving the frozen beverage dispenser a relatively small footprint.

The hopper 22 provides a storage compartment area for a liquid or mix to be chilled and dispensed by the frozen beverage dispenser 10. According to an exemplary embodiment, the hopper is provided at the top of the frozen beverage dispenser 10, above the freezing chamber 24 and is accessible via a cover 40. The cover 40 may be coupled to the top 15 of the housing 12 with a hinge or may not be coupled to the top 15. The cover 40 may include a handle 42. As shown in FIG. 1, the handle 42 may be recessed into the surface of the cover 40 and integrally formed with the cover 40. In other embodiments, the handle 42 may protrude from the top surface of the cover 40 or may be a separate body coupled to the cover 40.

The hopper 22 is configured to store the mix at a cooled temperature. According to an exemplary embodiments, a cooling coil 44 (e.g., evaporator) surrounds the hopper 22. The cooling coil 44 contains a refrigerant and is in fluid communication with other components of the refrigeration system 26, such as an expansion valve 45, a compressor 46, and a condenser 48 (e.g., heat exchanger). The hopper 22 hold a supply of a desired product mix, which may be mixed with water and transferred to the freezing chamber 24 as needed. The hopper 22 retains the liquid beverage product in refrigerated but not frozen conditions.

The hopper 22 may include a mix level sensor 50 (e.g., a probe sensor). According to an exemplary embodiment, the frozen beverage dispenser 10 is configured to alert an operator if the mix level sensor 50 detects a mix level below a predetermined level (e.g., a low mix level). A low mix situation may be communicated to the operator with a visual and/or audio indicator. For example, an add mix light 52 may be provided in an easily visible location on the housing 12 (e.g., the front panel 18) and may be illuminated when a low mix situation to prompt an operator to manually fill the hopper with additional beverage mix. The add mix light 52 may be configured to convey different mix levels to the operator. For example, in one embodiment, the add mix light 52 may be illuminated with a first color (e.g., orange) if the mix in the hopper 22 is sensed to be below a first level (e.g., a caution level) and may be illuminated with a second color (e.g., red) if the mix in the hopper 22 is sensed to be below a second, lower level (e.g., a warning level). In another embodiment, the add mix light 52 may be steadily illuminated if the mix in the hopper 22 is sensed to be at the first level and may blink if the mix in the hopper 22 is sensed to be below the second level.

According to another exemplary embodiment, the frozen beverage dispenser 10 may further include an optional external reservoir 54. For example, the external reservoir 54 may contain a dry or concentrated form of the beverage mix that is mixed in the hopper with water. The frozen beverage dispenser 10 may include an auto-fill functionality and may automatically add beverage mix to the hopper 22 from the reservoir 54 if a low mix situation is detected with the mix level sensor 50.

Cooled, liquid beverage mix is transferred from the hopper 22 to the freezing chamber 24 through an inlet tube 56. While in the freezing chamber 24, the beverage mix is chilled to form a frozen slush. The refrigeration system 26 chills the freezing chamber 24 with a cooling coil 58 (e.g., evaporator) surrounding the freezing chamber 24.

Figure 3:
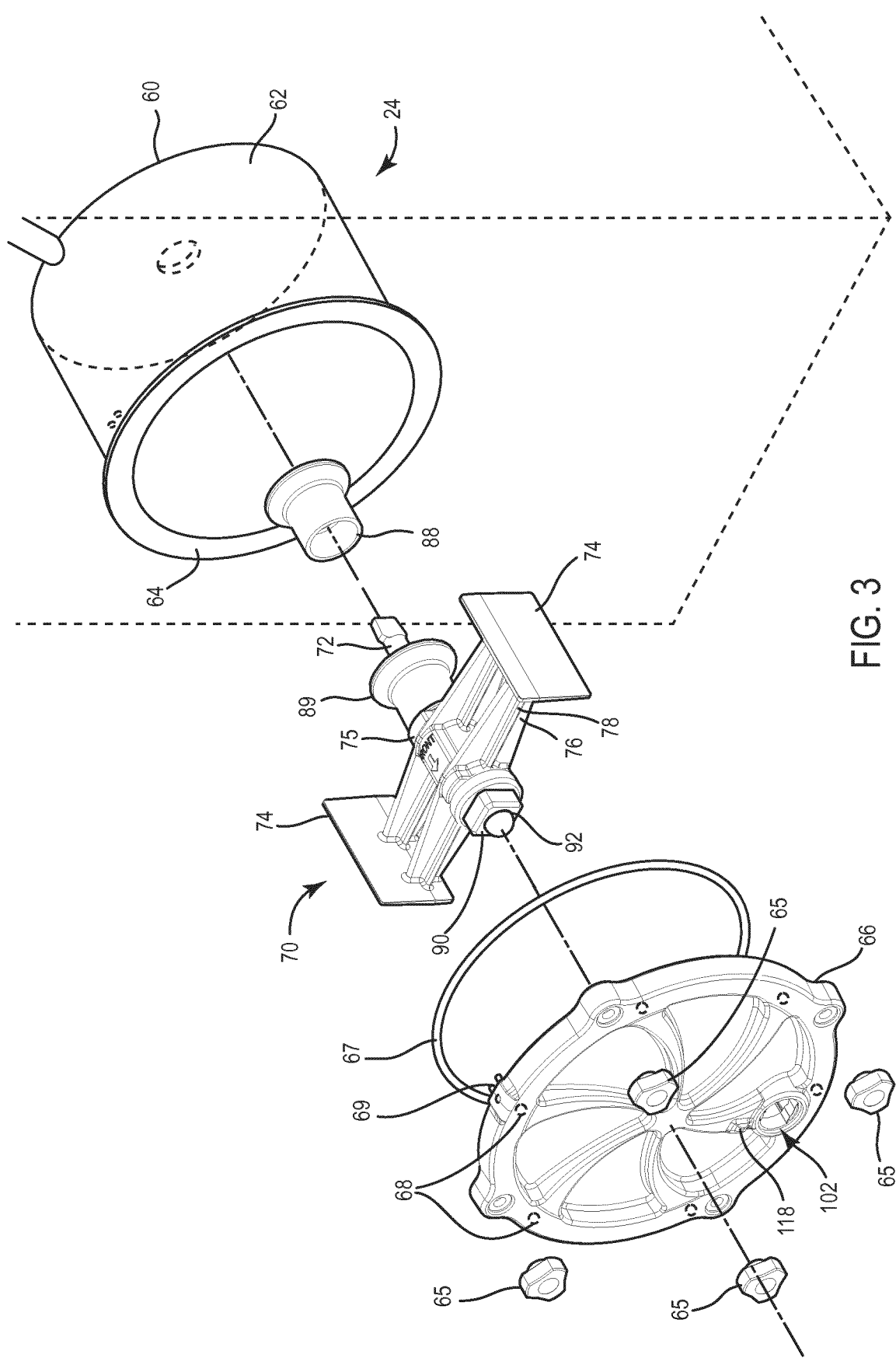
FIG. 3 is an exploded view of a freezing chamber of the frozen beverage dispenser of FIG. 1.

Referring now to FIG. 3, the freezing chamber 24 (e.g., barrel, mixing cylinder, etc.) is shown in more detail. The freezing chamber 24 is a generally closed, hollow, cylindrical body that is fixed in position within the housing 12. The freezing chamber includes a back panel 60 and a cylindrical side wall 62. The back panel 60 and the side wall 62 may be formed of a metal, such as stainless steel, or another material with a relatively high thermal conductivity to facilitate the heat transfer between the beverage in the freezing chamber 24 and the cooling coil 58. According to an exemplary embodiment, the liquid beverage mix enters the upper, rear portion of the freezing chamber 24, generally opposite of the spigot 100.

The forward end of the freezing chamber 24 extends through an opening in the front panel 18 of the housing 12. The front circumferential edge of the cylindrical side wall 62 forms an outwardly extending flange 64. A front cover 66 is coupled to the flange 64 to close the front of the freezing chamber 24. A sealing member, shown as an o-ring 67, is provided to seal the abutting faces of the flange 64 and the front cover 66. The front cover 66 is mounted to the front panel 18 with retaining knobs 65. The knobs 65 engage threaded studs coupled to the front panel 18, which extend forward through openings in the front cover 66. The knobs 65 allow the front cover 66 to be easily removed from the freezing chamber 24 to allow for access to the interior of the freezing chamber 24, such as to clean and/or sanitize the interior of the freezing chamber 24 or remove internal components for cleaning.

According to an exemplary embodiment, the front cover 66 may be formed from a transparent material, such as a transparent food-grade polymer. The transparent front cover 66 allows for the beverage to be viewed while it is being mixed in the freezing chamber 24 and allows an operator to view that a proper seal has been provided by the o-ring 67. Additionally, one or more illumination devices 68, such as lights, lamps, fluorescent bulbs, incandescent bulbs, and light-emitting diodes (LEDs), may be provided to illuminate the front cover 66 and the beverage within the freezing chamber 24. The LEDs 68 may, for example, be white or may be colored to compliment or contrast with the color of the beverage within the freezing chamber 24. In some embodiments, multiple LEDs 68 may be provided having different colors, allowing the color which with the front cover 66 is illuminated to be changed by turn on/off selected LEDs 68. The LEDs 68 may be operated with a controller 98 electrically coupled to the LEDs 68. The controller 98 may be configured or programmed to cause the LEDs to turn on and off in various patterns or lighting schemes. For example, different LEDs could be turned on to provide different colors of illumination, different patterns of LEDs could be turned on and off, etc. According to an exemplary embodiment, the LEDs 68 are integrated into the cover 66 (e.g., sealed within the cover 66) and are electrically coupled to the controller 98 by contacts or pins 69 protruding from the cover 66. Each pin 69 is received by a corresponding contact 71 in the front panel 18 to automatically couple the LEDs 68 to the controller 98 and/or the electrical system of the frozen beverage dispenser 10 when the cover 66 is coupled to the front panel 18. The LEDs 68 and pins 69 are integrated into the cover 66 in watertight manner so that the front cover 66 can be removed from the housing 12 and washed.

An auger 70 is provided within the freezing chamber 24 to continually circulate the beverage mix and prevent the formation of large ice crystals in the beverage mix. The auger 70 is rotated within the freezing chamber with the drive mechanism 28. The auger 70 includes a shaft 72, and a pair of scrapers 74 (e.g., beater bars) that are spaced apart from the shaft 72 and coupled to a central body portion 75 which surrounds the shaft 72 and is rotationally fixed to the shaft 72 (e.g., with a splined connection, a keyed connection, etc.). Arms 76 extend between the central body portion 75 and the scrapers 74 and may be reinforced with integrally formed ribs 78. The auger 70 is sized such that, when positioned concentrically within the freezing chamber, the scrapers 74 contact or are in close proximity with the side-wall 62 of the freezing chamber 24. As the auger 70 rotates within the freezing chamber 24, it continually removes frozen beverage mix from the side-wall 62 and circulates the beverage mix towards the center of the freezing chamber 24.

According to an exemplary embodiment, several components of the auger 70 are formed as a single, unitary body the central body portion 75, scrapers 74, and the arms 76 may be formed as a single body. In one embodiment, a several components of the auger 70 may be injection molded as a single unitary body from a food-grade polymer or plastic. Conventional augers are typically constructed with separate scrapers that are connected to the arms of a separate, metal body. With such augers, the varied pressure applied to the scrapers by the frozen beverage as the auger rotates transfers vibrations through the auger to the drive mechanism with each individual scraper arm contributing a possible vibration or oscillation to the body. These vibrations or oscillations cause the body to move relative to the shaft of the drive mechanism and can cause unwanted wear or strain on the drive mechanism. By forming the central body portion 75, the scrapers 74, and the arms 76 of the auger 70 as a single body, the oscillations or vibrations experienced by the drive mechanism 28 via the shaft 72 are reduced because the arms 76 are not individually and independently connected to the central body portion 75. Additionally, by forming the auger 70 as a single body, the number of parts of the frozen beverage dispenser 10 is reduced. This reduces the overall cost of manufacturing the frozen beverage dispenser 10 as well as increases the ease with which the operator may disassemble and clean the frozen beverage dispenser 10.

The shaft 72 of the auger 70 is rotationally coupled to the drive mechanism 28. The shaft 72 extends through an opening 80 in the back panel 60. A distal end of the shaft 72 is received by a drive coupling 84 and the output shaft 86 of the drive mechanism 28 (see FIG. 2). The drive mechanism 28 may include, for example, a motor, a gear reduction, and various bearings and mounts configured to support the drive mechanism within the interior of the housing 12. A rear seal 88 is provided at the rear end of the freezing chamber 24. The rear seal 88 is concentric with the shaft 72 and forms a fluid-tight seal about the outer surface of the shaft 72. The rear seal 88 is compressed between a ledge or stop 89 of the auger 70 and the back panel 60 of the freezing chamber 24 to provide a rotating seal with the back panel 60 and prevent the leaking of the beverage through the opening 80.

The forward end of the shaft 72 is received and supported by a front bushing 90. The front bushing 90 includes a central opening 92 through which the end of the shaft 72 extends. The front bushing 90 has a rectangular profile. The rectangular front bushing 90 is received in a similarly shaped rectangular socket formed in the front cover 66. With the front cover 66 coupled to the front panel 18 of the housing 12, the front bushing 90 is held in place between the central body portion 75 of the auger 70 and the front cover 66 such that it supports the forward end of the shaft 72.

The drive mechanism 28 and the refrigeration system 26 may be operated with a control switch 96 provided in an easily accessible position (e.g., on the front panel 18 of the housing 12), as shown in FIG. 1, and connected to the controller 98. According to an exemplary embodiment, the control switch 96 is a three position switch with an on position, an off position, and a cleaning position.

Figure 4:
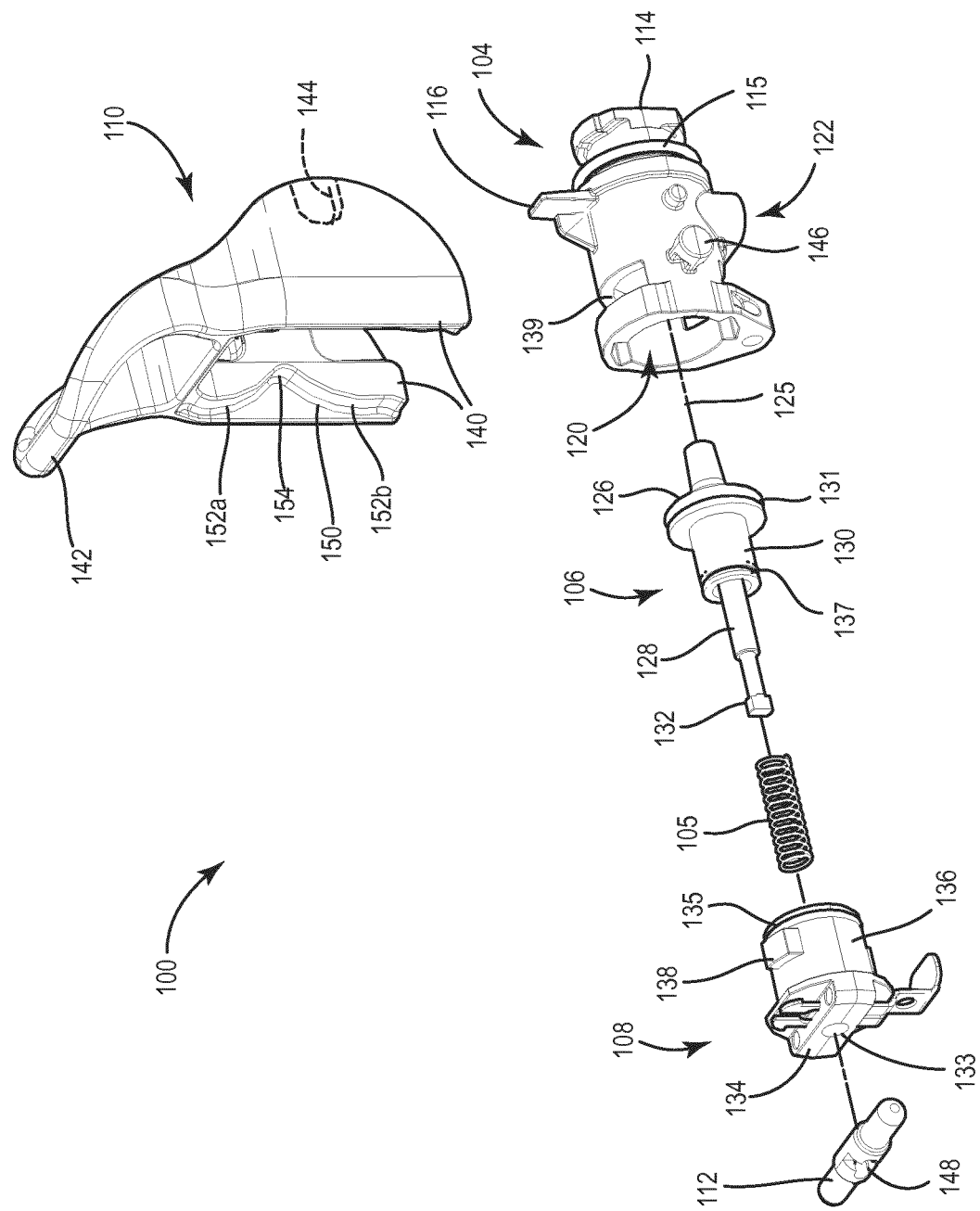
FIG. 4 is an exploded view of a spigot of the frozen beverage dispenser of FIG. 1.
Figure 5:
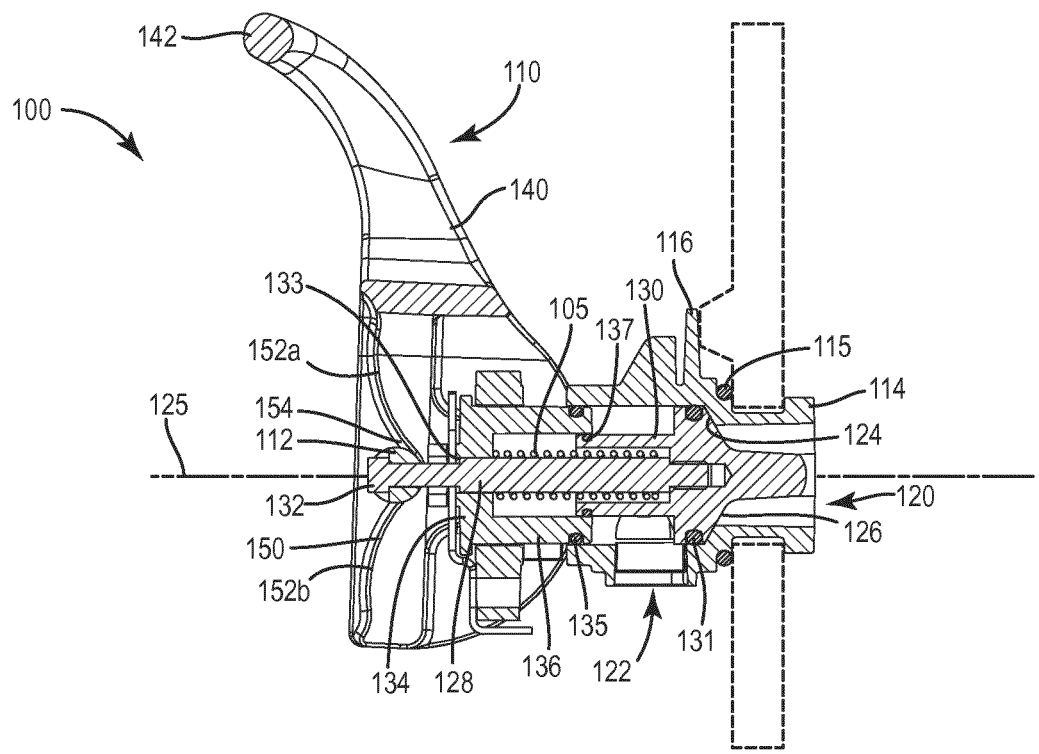
FIG. 5 is a cross-section view of a spigot for the frozen beverage dispenser of FIG. 1 in a neutral closed position.

The frozen beverage may be expelled from the interior of the freezing chamber 24 with a spigot 100 that is coupled to the front cover 66. The spigot 100 controls the flow of the frozen beverage through an spigot opening 102. According to an exemplary embodiment, the opening 102 is disposed at the bottom of the front cover 66. Referring now to FIGS. 4 and 5, the spigot 100 is shown in more detail. The spigot 100 includes a spigot housing 104, a valve plug 106 received within the spigot housing 104, a retainer 108, a spring 105 disposed between the retainer 108 and the valve plug 106, a pivoting handle 110, and a retaining pin 112 which is fixed to the valve plug 106 and engages the handle 110 as it pivots to move the valve plug 106 relative to the spigot housing 104. The spigot 100 is configured to allow an operator to open and close the spigot with one hand. In this way, the operator may hold a pitcher or other container under the spigot 100 with the other hand to collect the frozen beverage. The spigot 100 is configured for two-way operation. That is, the operator may open the spigot 100 both by pushing on the handle 110 and by pulling the handle 110.

The spigot housing 104 is received in the spigot opening 102 in the front cover 66. According to an exemplary embodiment, both a flange 114 at the rear end of the spigot housing 104 and the spigot opening 102 are shaped as truncated similarly sized circles. To couple the spigot 100 to the front cover 66, the spigot housing 104 is oriented such that the flange 114 is aligned with the opening 102, inserted through the opening 102 and then rotated such that the flange 114 is unable to pass back through the opening 102. A seal is formed between the front cover 66 and the spigot housing 104 with a sealing member, shown as an o-ring 115. The rotation of the spigot housing 104 relative to the front cover 66 may be limited, such as through contact between a lock tab 116 on the spigot housing 104 and a protrusion 118 on the front cover 66. The spigot 100 may be secured to the front cover 66 by twisting the spigot 100 a quarter of a turn (90 degrees) relative to the front cover 66 and along the lock tab 116 to move to a locked position. The spigot 100 may be removed from the front cover 66 by moving the lock tab 116 out of the locked position and twisting the spigot 100 a quarter turn in the opposite direction. These processes are carried out manually without the use of tools, thereby simplifying assembly and disassembly for the operator (e.g., when cleaning or otherwise servicing the frozen beverage dispenser 10).

The spigot housing 104 is generally shaped as a hollow, tubular body defining a central passage 120 configured to receive the valve plug 106 and the retainer 108 and having a longitudinal axis 125. The passage 120 extends the length of the spigot housing 104 and is in fluid communication with the freezing chamber 24 when the spigot housing 104 is received in the opening 102 in the front cover 66. The spigot housing further defines a lateral outlet conduit 122 that extends through the body of the spigot housing 104 and opens into the passage 120. As shown in FIG. 5, the walls of the central passage 120 proximate the outlet conduit 122 define a valve seat 124. A valve body 126 of the valve plug 106 is brought into contact with the valve seat 124 to prevent the flow of the frozen beverage from the central passage 120 to the outlet conduit 122 and is moved away from the valve seat 124 to allow the frozen beverage to pass from the freezing chamber 24 through the outlet conduit 122 via the central passage 120.

The valve plug 106 includes the main valve body 126 a stem or shaft 128, and a cylindrical collar 130 that surrounds the base of the shaft 128. The valve plug 106 is received in the central passage 120. A seal is formed between the peripheral cylindrical surface of the valve body 126 and the spigot housing 104 with a sealing member, shown as an o-ring 131. The spring 105 is disposed around the shaft 128. The distal end of the shaft 128 forms a coupling feature 132, configured to couple the valve plug 106 to the retaining pin 112. According to an exemplary embodiment, the coupling feature 132 is a flattened end portion that engages the retaining pin 112 in a manner similar to the coupling of the flange 114 and the front cover 66, as described in more detail below.

The retainer 108 is received in the central passage 120. The retainer 108 is a cup-shaped body that includes an end wall 134 and a cylindrical side wall 136. The distal end of the shaft 128 extends through an opening 133 in the end wall 134. The side wall 136 is received in the annular space between the spigot housing 104 and the collar 130 of the valve plug 106. A seal is formed between the side wall 136 and the spigot housing 104 with a sealing member, shown as an o-ring 135. A seal is formed between the side wall 136 and the collar 130 with a sealing member, shown as an o-ring 137.

The retainer 108 is fixed relative to the spigot housing 104 in a direction parallel to the longitudinal axis 125. According to an exemplary embodiment, the retainer 108 is fixed relative to the spigot housing 104 with a protrusion 138 that is received in a slot 139 in the spigot housing 104. In other exemplary embodiments, the retainer 108 may be otherwise fixed to the spigot housing 104, such as with a pin, a threaded connection, or other coupling mechanism. The spring 105 is compressed between the end wall 134 and the valve body 126. The spring 105 biases the valve plug 106 towards the front cover 66, forcing the valve body 126 against the valve seat 124.

The handle 110 is disposed at the end of the spigot 100 and allows an operator to open and close the spigot by moving the valve plug 106 relative to the spigot housing 104. The handle 110 includes a pair of side portions 140 that are spaced apart on either side of the spigot housing 104. A grip portion 142 extends laterally between the side portions 140 and provides a structure that may be grasped by the operator. The side portions 140 include recesses 144 that receive protrusions 146 extending outward from the spigot housing 104. The handle 110 pivots on the protrusions 146 in response to the operator placing a forward (pushing) or backward (pulling) force on the grip portion 142.

The distal end of the shaft 128 extends beyond the retainer 108. The distal end of the shaft 128 is removably coupled to the retaining pin 112. The biasing force of the spring 105, through the interconnection of the valve plug 106 and the retaining pin 112, applies a rearward force on the side portions 140 that maintains the contact between the side portions 140 and the protrusions 146 throughout the range of motion of the handle 110. According to an exemplary embodiment, the flattened coupling feature 132 of the shaft 128 engages a slot 148 in the retaining pin 112 in a manner similar to the coupling of the flange 114 and the front cover 66. The coupling feature 132 is inserted into the slot 148 with the retaining pin 112 in a vertical orientation. The retaining pin 112 may then be rotated into a horizontal position to couple the retaining pin 112 to the shaft 128. The relationship between the coupling feature 132 of the shaft 128 and the slot 148 of the retaining pin 112 allows the spigot 100 to secured and unsecured based on a quarter turn (90 degrees) of the retaining pin 112. These processes are carried out manually without the use of tools, thereby simplifying assembly and disassembly for the operator (e.g., when cleaning or otherwise servicing the frozen beverage dispenser 10).

Figure 6:
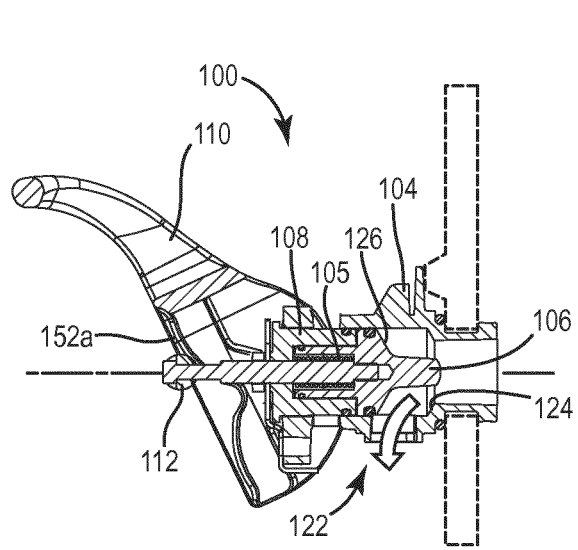
FIG. 6 is a cross-section view of a spigot for the frozen beverage dispenser of FIG. 1 in a first open position.
Figure 7:
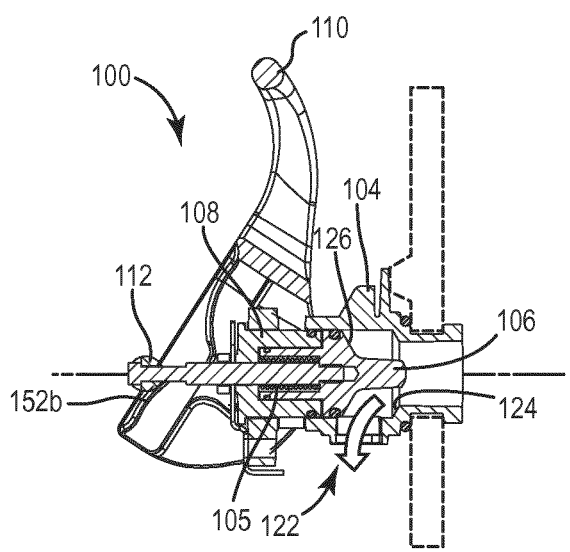
FIG. 7 is a cross-section view of a spigot for the frozen beverage dispenser of FIG. 1 in a second open position.

The ends of the retaining pin 112 rest on bearing surfaces 150 on the side portions 140 of the handle 110. The bearing surfaces 150 include convex curved portions 152 that are joined by a valley 154. In a neutral position, in which the spigot 100 is closed, the retaining pin 112 rests in the valley 154. As the handle 110 is pivoted from the neutral position to open the spigot 100, the retaining pin 112 moves away from the valley 154 and onto one of the curved portions 152. If the handle 110 is moved towards the operator (e.g., pulled), the retaining pin 112 moves from the valley to contact the upper curved portion 152a and the spigot 100 opens (see FIG. 6). If the handle 110 is moved away from the operator (e.g., pushed), the retaining pin 112 moves from the valley to contact the lower curved portion 152b and the spigot 100 opens (see FIG. 7). By providing curved portions 152 on either side of the valley 154, the handle 110 may be pivoted in either direction from the neutral position about the protrusions 146 while maintaining contact between the retaining pin 112 and the bearing surfaces 150. According to an exemplary embodiment, the handle 110 is formed from a polymer material with a relatively low coefficient of friction, such as ABS. This creates a smooth surface over which the retaining pin 112 may slide as the handle 110 is moved. The retaining pin 112 may be formed from a harder material, such as stainless steel.

As the retaining pin 112 moves from the valley 154 to one of the curved portions 152, it is moved along the longitudinal axis 125 in a direction away from the freezing chamber 24. Through the interconnection of the retaining pin 112 and the shaft 128 of the valve plug 106, this, in turn, moves the valve body 126 away from the valve seat 124 to allow the frozen beverage to pass from the freezing chamber 24 through the outlet conduit 122 via the central passage 120. The pulling or pushing of the handle 110 moves the valve plug 106 a relatively large distance relative to the spigot housing 104, creating a relatively large opening through which the frozen beverage may be dispensed. This allows an operator to rapidly fill a large container, such as a pitcher with the frozen beverage if the handle is pushed or pulled to the full extent of its movement. In some embodiments, a thirty-two fluid ounce pitcher can be filled in about five seconds. The frozen beverage may be dispensed more slowly, such as for a single serving, by only slightly pulling or pushing the handle 110 to create a smaller opening. Conventional frozen beverage dispensers typically include a handle that can only be moved in a single direction to the dispense frozen beverage (i.e, a handle that only dispenses when pulled toward the operator or a handle that only dispenses when pushed away from the operator). Also, such known dispensers may use valves not able to provide the rapid filling described above.

The spring 105 provides the spigot 100 with a self-closing function. If the operator releases the handle 110, the spring 105 moves the valve body 126 back into contact with the valve seat 124 to close the spigot 100 and moves the handle 110 back to the neutral position with the retaining pin 112 in the valley 154 of the bearing surfaces 150. In this way, the operator does not need to manually return the spigot 100 to a closed position and the spigot 100 cannot be left in an open position, minimizing waste. Any frozen beverage that is inadvertently not dispensed into a pitcher, glass, or other receptacle may be caught in a tray 160, provided below the spigot, as shown in FIG. 1. The tray 160 may be covered by a grill or screen 162.

The dispenser 10 may include a display 164. The display 164 is disposed in a highly visible area of the dispenser 10, such as on the front panel 18 of the housing 12, above the front cover 66. The display 164 may include advertising, information about the product or products, instructions for self-service, or other information. In some embodiments, the display 164 may be illuminated.

As utilized herein, the terms "approximately," "about," "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

It should be noted that the term "exemplary" as used herein to describe various embodiments is intended to indicate that such embodiments are possible examples, representations, and/or illustrations of possible embodiments (and such term is not intended to connote that such embodiments are necessarily extraordinary or superlative examples).

The terms "coupled," "connected," and the like as used herein mean the joining of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another.

References herein to the positions of elements (e.g., "top," "bottom," "above," "below," etc.) are merely used to describe the orientation of various elements in the FIG- URES. It should be noted that the orientation of various elements may differ according to other exemplary embodiments, and that such variations are intended to be encompassed by the present disclosure. It is also important to note that the construction and arrangement of the elements of the frozen beverage dispenser as shown in the preferred and other exemplary embodiments are illustrative only. Although only a few embodiments of the present invention have been described in detail in this disclosure, those skilled in the art who review this disclosure will readily appreciate that many modifications are possible (e.g., variations in sizes, dimensions, structures, shapes and proportions of the various elements, values of parameters, mounting arrangements, materials, colors, orientations, etc.) without materially departing from the novel teachings and advantages of the subject matter recited in the claims. Accordingly, all such modifications are intended to be included within the scope of the present invention as defined in the appended claims. The order or sequence of any process or method steps may be varied or re-sequenced according to alternative embodiments. In the claims, any means-plus-function clause is intended to cover the structures described herein as performing the recited function and not only structural equivalents but also equivalent structures. Other substitutions, modifications, changes and/or omissions may be made in the design, operating conditions and arrangement of the preferred and other exemplary embodiments without departing from the spirit of the present invention as expressed in the appended claims.

What is claimed is:

1. A frozen beverage dispenser for dispensing a frozen beverage product, comprising:
    a housing having a bottom, top, side walls, a front panel, and a rear panel, the housing defining an interior;
    a hopper configured to store a beverage product;
    a freezing chamber positioned within the interior of the housing, the freezing chamber fluidly coupled to the hopper;
    a front cover removably coupled to the housing to close a front end of the freezing chamber;
    a refrigeration system configured to refrigerate the beverage product in the freezer chamber to form the frozen beverage product;
    an auger positioned within the freezing chamber;
    a drive configured to rotate the auger about an auger rotation axis thereby causing the auger to circulate the beverage product within the freezing chamber;
    an air inlet formed near the bottom of the housing;
    a baffle positioned proximate the air inlet and within the interior of the housing to block a straight line path for sounds exiting the interior of the housing through the air inlet, the baffle being positioned to define at least two paths for air to flow around the baffle;
    a single air outlet formed near the rear and the top of the housing;
    a fan positioned within the interior of the housing, the fan for drawing air through the air inlet into the interior of the housing and along the at least two paths and exhausting air from the interior of the housing through the single air outlet; and
    a spigot fluidly coupled to the freezing chamber, the spigot comprising a handle, a valve, and an outlet, with the handle coupled to the valve to control operation of the valve;
    wherein with the valve in a closed position, the frozen beverage product does not pass through the valve; and
    wherein with the valve in an open position, the frozen beverage product passes through the valve and exits through the outlet of the spigot.

2. The frozen beverage dispenser of claim 1, wherein the auger comprises a central body, a plurality of arms, and a plurality of scrapers, wherein each of the arms extends from central body to one of the scrapers, and wherein the central body, arms, and scrapers are formed as a single unitary plastic body.

3. The frozen beverage dispenser of claim 1, wherein the handle is movable among three positions so that with the handle in the first position the valve is in the closed position, with the handle in the second position the valve is in the open position, and with the handle in the third position the valve is in the open position, wherein the first position of the handle is located between the second and third positions of the handle.

4. The frozen beverage dispenser of claim 3, wherein the handle is configured so that an operator pulls the handle toward the operator to move the handle to the second position to dispense the frozen beverage product from the outlet of the spigot and pushes the handle away from the operator to move the handle to the third position to dispense the frozen beverage product from the outlet of the spigot.

5. The frozen beverage dispenser of claim 4, further comprising:
    a spring that biases the valve to the closed position and the handle to the first position.

6. The frozen beverage dispenser of claim 1, wherein the spigot is configured to be manually secured to and detached from the front cover without the use of tools.

7. The frozen beverage dispenser of claim 6, wherein the spigot is configured to be manually assembled and disassembled without the use of tools.

8. The frozen beverage dispenser of claim 1, wherein the front cover includes an illumination device positioned to illuminate the front cover and the beverage product within the freezing chamber.

9. The frozen beverage dispenser of claim 8, wherein the front cover includes a plurality of pins extending from the cover and the pins are electrically coupled to the illumination device; and
    wherein the housing includes a plurality of contacts, each configured to receive one of the pins of the front cover when the front cover is coupled to the housing, thereby electrically coupling the illumination device to an electrical system for powering the illumination device.

10. The frozen beverage dispenser of claim 1, wherein the air inlet is one of a plurality of air inlets formed near the bottom of the housing.

11. A frozen beverage dispenser for dispensing a frozen beverage product, comprising:
    a hopper configured to store a beverage product;
    a freezing chamber fluidly coupled to the hopper;
    a front cover for closing a front end of the freezing chamber;
    a refrigeration system configured to refrigerate the beverage product in the freezer chamber to form the frozen beverage product;
    an auger positioned within the freezing chamber;
    a drive configured to rotate the auger about an auger rotation axis thereby causing the auger to circulate the beverage product within the freezing chamber; and
    a spigot fluidly coupled to the freezing chamber, the spigot comprising;
        a lock tab configured to couple the spigot to the front cover through 90 degree rotation of the lock tab relative to the front cover such that the lock tab is located on an exterior face of the front cover when the spigot is in a locked position;

a valve;

a handle coupled to the valve to control operation of the valve; and an outlet;

wherein with the valve in a closed position, the frozen beverage product does not pass through the spigot;

wherein with the valve in an open position, the frozen beverage product passes through the spigot and exits through the outlet of the spigot;

wherein the handle is movable among three positions so that with the handle in the first position the valve is in the closed position, with the handle in the second position the valve is in the open position, and with the handle in the third position the valve is in the open position, wherein the first position of the handle is located between the second and third positions of the handle; and wherein the handle is configured so that an operator pulls the handle toward the operator to move the handle to the second position to dispense the frozen beverage product from the outlet of the spigot and pushes the handle away from the operator to move the handle to the third position to dispense the frozen beverage product from the outlet of the spigot.

12. The frozen beverage dispenser of claim 11, further comprising:

a spring that biases the valve to the closed position and the handle to the first position.

13. The frozen beverage dispenser of claim 11, wherein the spigot is configured to be manually secured to and detached from the front cover without the use of tools.

14. The frozen beverage dispenser of claim 13, wherein the spigot is configured to be manually assembled and disassembled without the use of tools.

15. The frozen beverage dispenser of claim 11, further comprising:

an illumination device positioned to illuminate the front cover and the beverage product within the freezing chamber.

16. The frozen beverage dispenser of claim 11, wherein the valve moves horizontally when moving between the open position and the closed position.

17. A frozen beverage dispenser for dispensing a frozen beverage product, comprising:

a housing including a plurality of contacts electrically coupled to an electrical system;

a hopper configured to store a beverage product;

a freezing chamber fluidly coupled to the hopper;

a front cover removably coupled to the housing to close a front end of the freezing chamber, wherein the front cover includes an illumination device positioned to illuminate the front cover and the beverage product within the freezing chamber, wherein the front cover includes a plurality of pins extending from the front cover and the pins are electrically coupled to the illumination device, wherein when the front cover is coupled to the housing each of the contacts receives one of the pins to electrically couple the illumination device to the electrical system for powering the illumination device, and wherein the pins are removed from the contacts when the front cover is removed from the housing;

a refrigeration system configured to refrigerate the beverage product in the freezer chamber to form the frozen beverage product;

an auger positioned within the freezing chamber;

a drive configured to rotate the auger about an auger rotation axis thereby causing the auger to circulate the beverage product within the freezing chamber; and a spigot fluidly coupled to the freezing chamber, the spigot comprising a handle, a valve, and an outlet, with the handle coupled to the valve to control operation of the valve;

wherein with the valve in a closed position, the frozen beverage product does not pass through the valve; and wherein with the valve in an open position, the frozen beverage product passes through the valve and exits through the outlet of the spigot.

18. The frozen beverage dispenser of claim 17, wherein the illumination device comprises one or more LEDs.

19. The frozen beverage dispenser of claim 17, wherein the illumination device comprises a plurality of LEDs of different colors and further comprising:

a controller electrically coupled to the LEDs, wherein the controller is configured to selectively turn the plurality of LEDs on and off to illuminate the front cover and the beverage product within the freezing chamber with the different colors.

20. The frozen beverage dispenser of claim 17, wherein the plurality of pins includes a pair of pins, wherein the illumination device includes a plurality of LEDs electrically coupled to the pair of pins.

* * * * *